United States Patent
Ekkel et al.

(10) Patent No.: US 12,033,387 B2
(45) Date of Patent: Jul. 9, 2024

(54) SYSTEMS AND METHODS FOR IDENTIFYING AND TRACKING A TARGET

(71) Applicant: SIGNIFY HOLDING B.V., Eindhoven (NL)

(72) Inventors: Jan Ekkel, Oss (NL); Harry Broers, 'S-Hertogenbosch (NL); Ruben Rajagopalan, Neuss (DE); Maurice Herman Johan Draaijer, Ittervoort (NL)

(73) Assignee: SIGNIFY HOLDING B.V., Eindhoven (NL)

(*) Notice: Subject to any disclaimer, the term of this patent is extended or adjusted under 35 U.S.C. 154(b) by 548 days.

(21) Appl. No.: 17/283,762

(22) PCT Filed: Oct. 1, 2019

(86) PCT No.: PCT/EP2019/076579
§ 371 (c)(1),
(2) Date: Apr. 8, 2021

(87) PCT Pub. No.: WO2020/074322
PCT Pub. Date: Apr. 16, 2020

(65) Prior Publication Data
US 2021/0334549 A1    Oct. 28, 2021

(30) Foreign Application Priority Data
Oct. 8, 2018  (EP) .................... 18199019

(51) Int. Cl.
*G06K 9/00*  (2022.01)
*G06V 20/52*  (2022.01)
*H04W 64/00*  (2009.01)

(52) U.S. Cl.
CPC .......... *G06V 20/52* (2022.01); *H04W 64/003* (2013.01); *H04W 64/006* (2013.01)

(58) Field of Classification Search
CPC .............. G06T 7/292; G08B 13/19695; G08B 13/19641; G08B 13/19608; G08B 15/00;
(Continued)

(56) References Cited

U.S. PATENT DOCUMENTS 7,929,017 B2   4/2011   Aggarwal et al.
9,762,865 B2 * 9/2017   Carey ................... H04N 7/181
(Continued)

FOREIGN PATENT DOCUMENTS

WO    2017102629 A1   6/2017

OTHER PUBLICATIONS

Thuy Thi Thanh Pham, et al., "Fusion of Wifi and Visual Signals for Person Tracking," International Research Institute MICA, ISBN 978-1-4503-4815-7/16/12, 2016 (7 Pages).

*Primary Examiner* — Congvan Tran

(57) ABSTRACT

A method of tracking a target including detecting and localizing an incident in a first area using a first sensor system; determining a target within a plurality of targets associated with the incident in the first area; and tracking the target from the first area to a second area using a second sensor system. The method further includes collecting unique identifiers for the plurality of targets using wireless packet analyzers and determining a digital identity of the target in the first area based on a correlation between the tracking of the target and the unique identifiers collected by the first and second wireless packet analyzers.

9 Claims, 3 Drawing Sheets

(58) Field of Classification Search
CPC ...... G08B 13/1966; G08B 25/08; G08B 1/08; G08B 25/10; G06V 20/52; G06V 20/44; H04W 64/006; H04W 64/003
See application file for complete search history.

(56) References Cited

U.S. PATENT DOCUMENTS

| | | |
|---|---|---|
| 9,930,119 B2 | 3/2018 | Hari et al. |
| 11,004,337 B2 * | 5/2021 | Subramanya .......... G08G 1/143 |
| 2007/0257985 A1 | 11/2007 | Estevez et al. |
| 2013/0150074 A1 | 6/2013 | Shrestha et al. |
| 2013/0165157 A1 * | 6/2013 | Mapes ................... G06Q 10/10 |
| | | 455/456.5 |
| 2014/0066028 A1 | 3/2014 | Miller et al. |
| 2014/0066089 A1 | 3/2014 | Monks et al. |
| 2015/0138332 A1 | 5/2015 | Cheng et al. |
| 2016/0127931 A1 * | 5/2016 | Baxley ..................... G06T 7/60 |
| | | 455/67.16 |
| 2016/0335484 A1 * | 11/2016 | Xie ........................ H04N 7/181 |

\* cited by examiner

400

Provide a tracking system including
an incident detection system and wireless packet analyzers
410

Detect and localize an incident in a first area
420

Determine at least one target within a plurality of targets to be identified
430

Track the target to be identified from the first area to a second area
440

Collect unique identifiers with multiple wireless packet analyzers
450

Determine a digital identity of the target based on
a correlation between the tracking and the collected unique identifiers
460

FIG. 4

SYSTEMS AND METHODS FOR IDENTIFYING AND TRACKING A TARGET

CROSS-REFERENCE TO PRIOR APPLICATIONS

This application is the U.S. National Phase application under 35 U.S.C. § 371 of International Application No. PCT/EP2019/076579, filed on Oct. 1, 2019, which claims the benefit of European Patent Application No. 18199019.3, filed on Oct. 8, 2018. These applications are hereby incorporated by reference herein.

FIELD OF THE INVENTION

The present disclosure is directed generally to sensing systems, and more particularly, to systems and methods for identifying and tracking a target using sensors and wireless communication.

BACKGROUND

Intelligent sensors can be used for incident detection based on sounds and/or behaviors of people. For example, intelligent sensors can detect criminal activity by sensing abnormal behavior. However, it can be difficult to ascertain a specific identity of a person who is believed to be responsible for an incident using video surveillance alone. Ascertaining a specific identity of an individual observed with video surveillance can be improved by locating a digital device, such as, a mobile phone of the individual since digital devices transmit data packets that include uniquely identifying information. A location of a mobile phone can be estimated using triangulation, which requires access to a cell phone signal from three or more cell towers via a cell phone carrier. Unfortunately, when a detected criminal offender is amidst a crowd of individuals each having a mobile phone, the mobile phone of the detected criminal offender cannot be uniquely identified and/or tracked without information from a variety of cell phone carriers. Moreover, once a detected criminal offender is beyond the area covered by intelligent sensors, wireless packet analyzers can take over tracking the mobile phone but only if the unique identifier of the mobile phone is known which is not always the case.

SUMMARY OF THE INVENTION

There is a continued need in the art for systems and methods for identifying and tracking a target using sensors and wireless communication without requiring triangulation techniques, which are expensive and cumbersome.

The present disclosure is directed to inventive methods and systems for identifying and tracking a target within an area using a tracking system. Various embodiments and implementations herein are directed to a method and system configured to derive a digital identity of a target based on a correlation between one or more observed locations of the target and uniquely identifying information transmitted from a mobile device collocated with the target. An incident and a plurality of targets associated with the incident are detected and localized using an incident detection system. One or more targets within the plurality of targets are determined to be identified and the one or more targets are tracked with the incident detection system. Unique identifiers for the plurality of targets are collected using wireless packet analyzers. An algorithm combines location information and analyzing information to determine digital identities for the one or more targets present at the location of the incident.

All examples and features mentioned below can be combined in any technically possible way.

Generally, in one aspect, a method of tracking at least one target is provided. The method includes: (i) detecting and localizing an incident in a first area using a first sensor system; (ii) determining the at least one target to be identified within a plurality of targets associated with the incident in the first area; (iii) tracking the at least one target from the first area to a second area using a second sensor system; (iv) collecting, by first and second wireless packet analyzers, data comprising unique identifiers for the plurality of targets, the first wireless packet analyzer collecting first and second unique identifiers in a first detection area covering the first area and the second wireless packet analyzer collecting the first or second unique identifier in a second detection area covering the second area; and (v) determining the digital identity of the at least one target in the first area based on a correlation between the tracking of the at least one target to the second area and the first or second unique identifier collected by the second wireless packet analyzer.

According to an embodiment, the first sensor system comprises a video surveillance system having a network of a plurality of cameras.

According to an embodiment, the first sensor system comprises an acoustic detection system having a network of microphones.

According to an embodiment, each unique identifier that is collected for each target of the plurality of targets is from a mobile device.

According to an embodiment, the method further includes the step of collecting, by the second wireless packet analyzer, a third unique identifier that is not collected by the first wireless packet analyzer.

According to an embodiment, the second sensor system is part of the first sensor system.

According to an embodiment, the first and second detection areas of the first and second wireless packet analyzers, respectively, do not overlap.

According to an embodiment, the method further includes the step of tracking the at least one target in a third area using the determined digital identity and a third wireless packet analyzer.

According to an embodiment, the second area is separate and distinct from the first area and not covered by the first sensor system.

Generally, in another aspect, a system for tracking at least one target is provided. The system includes: (i) a first sensor system configured to detect and localize an incident in a first area; (ii) a second sensor system configured to track the at least one target within a plurality of targets associated with the incident from the first area to a second area; (iii) first and second wireless packet analyzers configured to collect data comprising unique identifiers for the plurality of targets, the first wireless packet analyzer configured to collect first and second unique identifiers in a first detection area covering the first area and the second wireless packet analyzer configured to collect the first or second unique identifier in a second detection area covering the second area; and (iv) a controller configured to determine the digital identity of the at least one target in the first area based on a correlation between the tracking of the at least one target to the second area and the first or second unique identifier collected by the second wireless packet analyzer.

According to an embodiment, the first sensor system comprises a video surveillance system having a network of a plurality of cameras.

According to an embodiment, the first sensor system comprises an acoustic detection system having a network of microphones.

According to an embodiment, the second sensor system is part of the first sensor system.

According to an embodiment, the first and second detection areas of the first and second wireless packet analyzers, respectively, do not overlap.

According to an embodiment, each unique identifier that is collected is from a mobile device.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 4 is a flowchart for a method of tracking and identifying an individual, in accordance with an embodiment.

DETAILED DESCRIPTION OF EMBODIMENTS

The present disclosure describes various embodiments of systems and methods for identifying a target, e.g., a person or an object, within an area including a number of similar targets using sensors and wireless packet analyzers (also known as wireless packet sniffers). The present disclosure also describes various embodiments of systems and methods for tracking a target in situations when one or more sensors are no longer available. More generally, Applicant has recognized and appreciated that it would be beneficial to combine incident detection systems with mobile device tracking systems to enable improved identifying and tracking of targets. Accordingly, the systems and methods described or otherwise envisioned herein combine an incident detection system configured to detect and track a target with wireless packet analyzers to associate a unique digital identity with an individual target. This technology can be applied anywhere having surveillance systems and wireless networks. For example, the systems and methods described herein can be used for public safety purposes to localize individuals after an incident occurs in a crowded situation. Similarly, the systems and methods described herein can be used in retail environments to identify and track shoplifters.

For example, after a shoplifting incident occurs in a crowded area, a video surveillance system can be used to detect and track a targeted person. Although an identity of the targeted person cannot be retrieved from the surveillance system, wireless packet analyzers within the surveilled area can collect uniquely identifying information from devices carried by the tracked individuals and such data can be combined with data from the surveillance system to generate a correlation between a particular person observed with the surveillance system and a unique identifier of a particular device. Once the correlation is generated, the individual can be tracked by wireless packet analyzers alone. Thus, when the shoplifter flees the area and gets into a cab, the shoplifter's mobile phone can be tracked even though he/she is beyond the reach of the video surveillance system.

Figure 1:
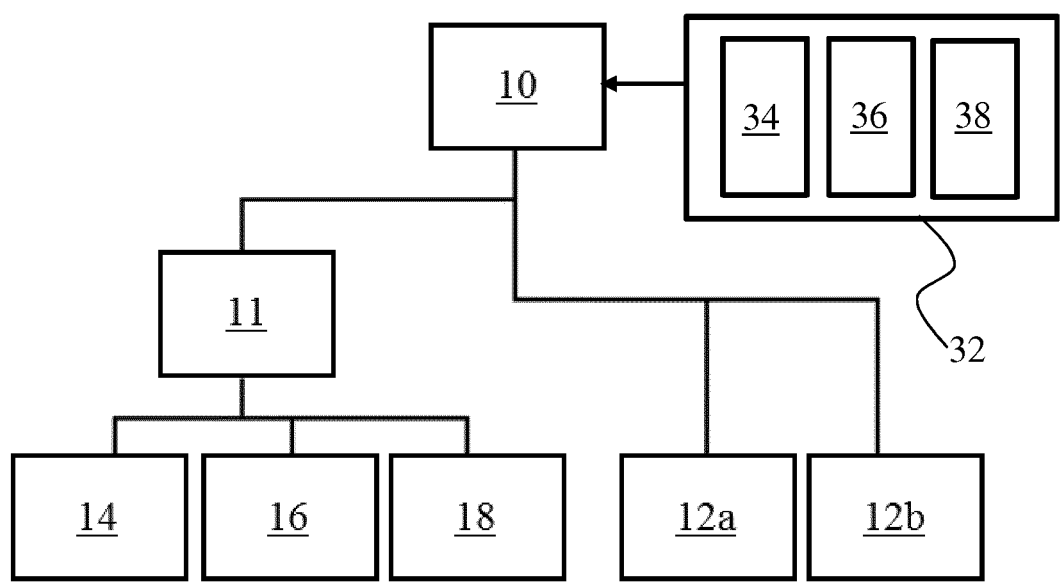
FIG. 1 is a schematic block diagram of a target tracking system comprising an incident detection system and a tracking system, in accordance with an embodiment.
Figure 2A:
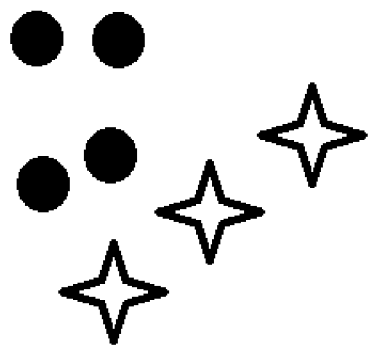
FIG. 2A is an example visualization of an incident and individuals associated with the incident using an incident detection system based on behaviors of people, in accordance with an embodiment.
Figure 2B:
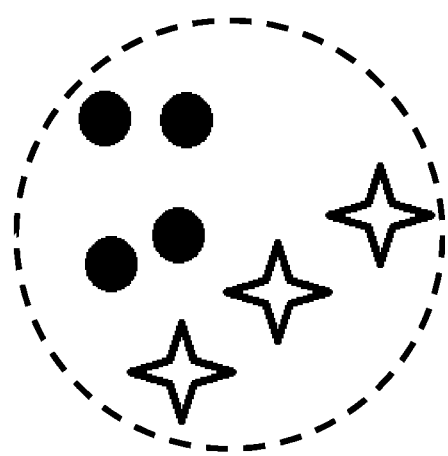
FIG. 2B is a schematic depiction of a system configured to detect individuals with an incident detection system and a wireless packet analyzers, in accordance with an embodiment.
Figure 2C:
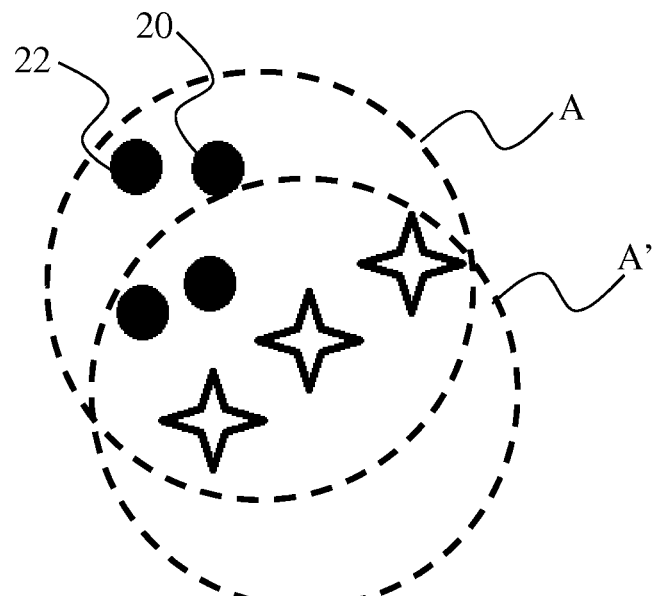
FIG. 2C is a schematic depiction of a system configured to detect individuals with an incident detection system and two wireless packet analyzers, in accordance with an embodiment.
Figure 3:
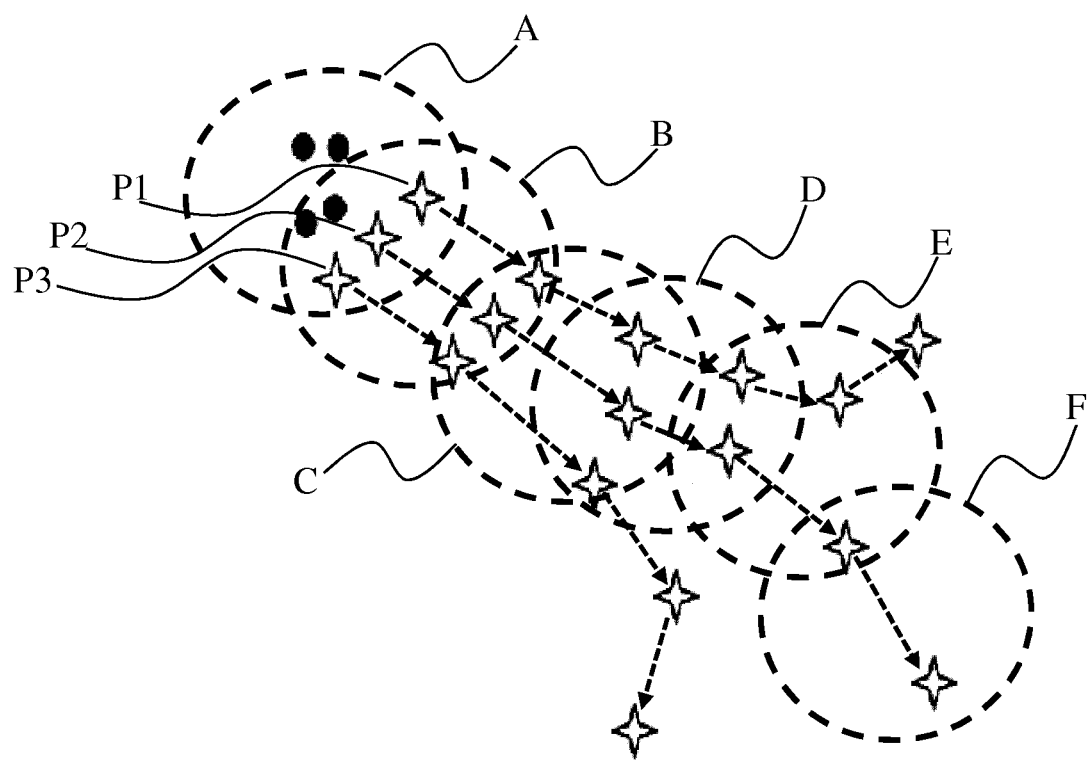
FIG. 3 is a schematic depiction of a system configured to detect individuals with an incident detection system and multiple wireless packet analyzers, in accordance with an embodiment.

Referring to FIGS. 1-3, in one embodiment, a tracking system 10 is depicted including an incident detection system 11 and wireless packet analyzers 12. FIG. 1 shows a schematic block diagram of a system comprising an incident detection system and a tracking system. FIG. 2A shows an example visualization of an incident and individuals associated with the incident using an incident detection system based on behaviors of people. FIGS. 2B and 2C show schematic depictions of systems detecting individuals with an incident detection system and wireless packet analyzers. FIG. 3 shows a schematic depiction of a system configured to detect individuals with an incident detection system and multiple wireless packet analyzers. Alphabetic suffixes ('a', 'b', etc.) have been appended to individual wireless packet analyzers to facilitate discussion with respect to particular wireless packet analyzers. Similar naming conventions (alphabetic suffixes applied to base reference numerals) are utilized herein with respect to other components. It is to be appreciated that any discussion with respect to a component with a reference numeral that does not include an alphabetic suffix applies generally to all of the components sharing that base reference numeral, regardless of suffix (e.g., discussion of "the wireless packet analyzers 12" applies to each of the wireless packet analyzers 12a and 12b).

In the illustrated embodiment, the incident detection system 11 includes a connected incident detection system with one or more sensor modalities, e.g., a video surveillance system observing a public space. The system is configured to detect incidents and/or objects. In example embodiments, the system is configured to detect incidents and/or objects and track people and/or objects involved with the incident based on any suitable technology, for example, video tracking technology. In example embodiments, the system is configured to record biometric information which can be used to identify a person, e.g., via facial or speech recognition technologies. As shown in FIG. 1, incident detection system 11 can include one or more cameras 14 or a network of cameras, and/or one or more microphone arrays 16 or a network of microphones, and/or other sensors 18. While the specific embodiments described in detail herein include one or more cameras to detect and localize an incident, it should be appreciated that alternative sensing technology can be used to detect and localize an incident. Instead of cameras, acoustic detection technology can be used to detect and localize an incident and the incident can be linked with people or object(s) that can be observed.

For example, devices that include a number of different sensors and are location-aware, such as, mobile phones and autonomous vehicles, can be used to detect and localize incidents and inform a tracking system on a location of an incident. In a retail setting, a smart location-aware luminaire including a lighting fixture and an embedded microphone can be configured to detect an audio alarm and subsequently the location-aware luminaire can be configured to communicate with a surveillance system about the detected incident. Similarly, in an outdoor setting, one or more streetlights can be configured with audio-based incident detection and can be configured to communicate with a surveillance system to localize a location of an incident. Additionally or alternatively, a network of gas sensors can be used to localize a gas spill due to an automobile accident. Combining gas sensors with an anemometer for measuring speed and direction of wind can provide more accurate localization.

Incident detection system 11 can also be based on connected thermal detectors, LIDAR-based detection systems, or time-of-flight technologies. For example, time-of-flight three-dimensional imaging technology can be used to detect the precise shapes of individuals to detect and localize an incident and further to track an individual or an object via behavior analysis and movement trajectories. By way of another example in an outdoor setting, one or more streetlights with built-in accelerometers and GPS localization can be configured to communicate with a surveillance system to localize a position of an incident. The built-in accelerometer can be configured to detect values of pole sway or tilting relative to an upright configuration or any other configuration. When the values are within a certain range or below a certain threshold, the values can indicate normal swaying or tilting conditions, for example, due to harmless environmental conditions. Detected values that exceed a certain range or a certain threshold can indicate abnormal or dangerous swaying or tilting conditions, for example, due to a high-speed vehicular impact. In other words, if a vehicle collides with a streetlight at high speeds, the streetlight will sway and/or tilt due to the impact and the accelerometer will generate larger than normal values. In embodiments, incident detection system 11 can include one or more smart location-aware streetlights or a network of smart location-aware streetlights to detect an automobile accident causing pole sway or tilting of the pole. Additionally or alternatively, contextual data pertaining to a time of the abnormal swaying or tilting can be used in conjunction with the values from the accelerometer for incident detection.

FIG. 2A shows an example visualization of individuals or objects (targets) detected and localized with incident detection system 11. In example embodiments, incident detection system 11 includes a video surveillance system covering a space and an incident and targets associated with the incident can be detected and visualized based on behaviors. In FIG. 2A, the circles represent individuals believed to be not associated with an incident and the stars represent individuals believed to be involved with the incident. Although there are seven individuals detected including three individuals who are believed to be involved in the incident, particular identities of the three individuals cannot be retrieved from the video surveillance system of incident detection system 11.

FIG. 2B shows a dotted circle surrounding the individuals detected using the incident detection system in FIG. 2A. The dotted circle represents a detection area of a wireless packet analyzer 12. Using a wireless packet analyzer 12, a group of unique identifiers can be collected from the detection area shown. In other words, in the example shown in FIG. 2B, seven unique identifiers can be collected by a wireless packet analyzer where each unique identifier is associated with one of the targets within the dotted circle. In example embodiments, the unique identifiers are transmitted from digital devices attached to or incorporated within objects or carried by people. However, since there are multiple devices transmitting uniquely identifiable wireless data packets, the incident detection system coupled with a single wireless packet analyzer cannot determine which unique identifier belongs to which individual. A wireless packet analyzer can function with a radio receiver and antenna. Different antennas or groups of antennas can be applied to add to the detection areas. For example, the detection areas can be adjusted or made extremely large, e.g., covering hundreds of miles. A cascade of detection areas can help track a target effectively and efficiently by searching broadly and then zooming in to the area of interest. In example embodiments, a detection area of a wireless packet analyzer and a video surveillance area can be tuned such that they closely overlap. The physical area overlap might ease the tracking and reduce false positives. In other words, those targets that can be visualized can also be analyzed.

Another option is to create zones or ports, e.g., railway stations or some other designated points along a track or path. In this way, a movement-schedule of a user carrying a mobile device can be created by tracking uniquely identifiable mobile devices through these zones or ports. Some devices transmit probe requests very seldom (e.g., 15 minutes to hourly or longer) thus, it might be beneficial to collect uniquely identifying information over long periods of time (e.g., hours). FIG. 2C shows two dotted circles representing two detection areas A and A' of two wireless packet analyzers 12. In example embodiments, wireless packet analyzers 12 comprise connected wireless packet analyzers, e.g., Wi-Fi, Bluetooth, 3G, 4G LTE, 5G, etc., that are configured to track individual digital devices with a specific digital signature with a certain localization accuracy. The detection area A of a wireless packet analyzer is shown surrounding all seven individuals discussed above and the detection area A' of another wireless packet analyzer is shown surrounding only five of the individuals including all three individuals represented by a star. Since seven unique identifiers can be collected from a wireless packet analyzer corresponding with detection area A and five unique identifiers, which are the same as five of the seven unique identifiers from detection area A, can be collected from another wireless packet analyzer corresponding with detection area A', the two unique identifiers that are not collected from both wireless packet analyzers for both detection areas A and A' can be associated with targets 20 and 22. However, since five uniquely identifiable wireless data packets are collected including the three individuals represented by a star, the system still cannot determine which unique identifier among the five unique identifiers belongs to which individual tracked within detection area A'. Although there are only two wireless packet analyzer detection areas shown in FIG. 2C, wireless packet analyzer detection areas A and A' are part of a larger set which covers a larger area covered by the video surveillance system of incident detection system 11.

In FIG. 3, the video surveillance system of incident detection system 11 tracks the individuals represented as stars as they move along the paths shown P1, P2, and P3, and wireless packet analyzers A, B, C, D, E, and F collect unique identifiers from devices within specific areas. Each wireless packet analyzer A, B, C, D, E, and F covers a specific area of interest (a detection area) and identifies multiple unique devices and thus individuals as they enter and leave each area or cell. In example embodiments, the video surveillance system tracks the individuals based on an explicit incident detected. However, in alternate embodiments, the video surveillance system tracks the individuals without an explicit incident detected. For example, in areas having poor signal reception quality, tracking by a video surveillance system can be initiated within a particular RF communication cell and continued in neighboring cells based on the initiated tracking rather than an explicit incident detected. Incident detection and localization can also be provided by a third party.

As shown in FIG. 3, the three individuals represented by stars travel in different paths P1, P2, and P3 and end up in discrete locations. The tracking system 10 collects data from all analyzers along a path of an individual to be identified to identify which unique identifier belongs to that individual. In the example depicted in FIG. 3, all three individuals travel from the area of wireless packet analyzer A to the areas of wireless packet analyzers B and C along paths P1, P2, and P3. Thereafter, only two of the three individuals travel to the areas of wireless packet analyzers D and E along paths P1 and P2. Finally, only one of the three individuals travels to the area of wireless packet analyzer F along path P2. The tracking system 10 combines data from all analyzers along path P2 to identify which unique identifier belongs to the individual that starts in the area covered by wireless packet analyzer A and ends up in the area covered by wireless packet analyzer F. In an example embodiment, the wireless packet analyzers A through F share the unique identifiers of the devices with a cloud service. In embodiments where the individuals represented by stars are recognizable via facial recognition, for example, the system 10 can collect data from the first and last analyzers A and F without the intermediary analyzers.

By tracking the individuals with the video surveillance system and monitoring the unique identifiers with the wireless packet analyzers, a correlation can be made between a specific individual in a particular area and a unique identifier collected by multiple wireless packet analyzers. Similar correlations can be made between the other individuals represented by stars and unique identifiers collected by wireless packet analyzers not shown. When a digital identity is linked to a person or object, it is no longer necessary to track the individual with a video surveillance system. The individual can be tracked with radio frequency (RF) tracking alone, for example. Thus, since tracking can be achieved with the sensor network and a wireless network and the wireless network is larger than most sensor networks, the systems and methods described herein can achieve more robust tracking advantageously. It should be appreciated that while a single incident detection system can be configured to detect and localize an incident and subsequently track individuals and/or objects involved with the incident, separate systems can be responsible for detecting and localizing an incident and tracking individuals and/or objects thereafter as further discussed below.

The tracking system 10 may include or be in communication with a controller 32 arranged to facilitate operation of the incident detection system 11 and the wireless packet analyzers 12. For example, the controller 32 may include a processor 34, a memory 36, and/or a communication module 38. The processor 34 may take any suitable form, such as a microcontroller, plural microcontrollers, circuitry, a single processor, or plural processors configured to execute software instructions. The memory 36 may take any suitable form or forms, including a volatile memory, such as random access memory (RAM), or non-volatile memory such as read only memory (ROM), flash memory, a hard disk drive (HDD), a solid state drive (SSD), or other data storage media. The memory 36 may be used by the processor for the temporary storage of data during its operation. Data and software, such as the data transmitted via the analyzers 12 and sensors 14, 16, and 18 and/or the algorithms or software necessary to analyze the transmitted data and/or orient one or more cameras or microphones, as well as an operating system, firmware, or other application, may be installed in the memory 36. The communication module 38 is arranged to enable communication between the components of the system 10. The communication module 38 may be any module, device, or means capable of enabling the transmission and/or reception of a wired or wireless communication signal, utilizing technologies that include, but are not limited to Wi-Fi (e.g., IEEE 802.11), Bluetooth, cellular, Ethernet, Zigbee, etc.

The controller 32 may be embedded into the incident detection system 11 or the wireless packet analyzers 12 (e.g., to enable functionality of a smart or connected incident detection system or connected wireless packet analyzers). Additionally, it is to be appreciated that some or all of the computing resources for the controller 32 may be implemented by designated network infrastructure and/or cloud-based computing devices (e.g., a server, gateway, router, or other computing device in communication with the system 10 via the internet or other data network).

In example embodiments, the incident detection system 11 is located in outdoor luminaires to achieve optimal camera view. The outdoor luminaires refer to any outdoor lighting infrastructure that includes a light fixture, such as a light fixture, extending from a support, such as a pole, in order to illuminate a surrounding area. One or more controllers can be embedded into a light fixture to enable functionality of a smart or connected system of sensors and/or lighting.

In example embodiments, the wireless packet analyzers are also arranged at outdoor luminaires for optimal sensor power supply since the outdoor luminaires are already electrically wired to power the light fixture. Furthermore, outdoor luminaires are commonly installed at regular intervals along a road, street, sidewalk, or other path, which extends to and/or between various locations where people travel. In this way, by installing the wireless packet analyzers at the outdoor luminaires, the system 10 can be formed as a connected network of wireless packet analyzers, e.g., extending in any desired direction throughout all or part of a city, town, or other locations. Additionally, it is to be appreciated that existing lighting infrastructure can be leveraged by retrofitting the wireless packet analyzers on existing lights outside or inside buildings or other structures.

In example embodiments, one or more cameras in a different location can be updated with one or more images of an identified person or object to enable recognition of the person or object and data collected from wireless packet analyzers can be used to corroborate locating the identified person or object at the different location.

In example embodiments, the tracking system 10 is configured to track a target using connected wireless packet analyzers and without using visual data obtained by a sensor system. For example, by knowing the locations of multiple targets the connected wireless packet analyzers can be used to track those targets with a mobile digital device. One or more cameras can be used to track targets without a mobile digital device.

In example embodiments, the systems and methods described herein can be coupled with license plate recognition systems in parking garages and other places. For example, people identified by biometrics, facial recognition, Wi-Fi probe requests, Wi-Fi address, Bluetooth MAC address etc., can be coupled to license plates mounted on vehicles such that when people are observed at certain places they can be identified based on car movement and identified crime scenes or other incidents.

FIG. 4 is a flowchart for an example method 400 of tracking and identifying an individual. At step 410, a tracking system is provided. The tracking system can be any system described or otherwise envisioned herein including an incident detection system and wireless packet analyzers.

At step 420 of the method, an incident and a plurality of targets associated with the incident are detected and localized in a first area using sensors of the incident detection system. At step 430 of the method, at least one target within the plurality of targets is determined to be identified using the incident detection system. At step 440 of the method, the at least one target is tracked within the first area using the incident detection system or another tracking system in communication with the incident detection system. For example, once the plurality of targets are detected and localized using a location-aware luminaire including a lighting fixture and an embedded microphone detecting an audio alarm, the location-aware luminaire can inform a separate surveillance system about the detected incident and the separate surveillance system can track the targets. It should be appreciated that the incident detection system only needs to detect and localize the incident. The location of the incident can be used by other tracking systems to follow the target. Alternatively, the incident detection system can serve both functions as well.

At step 450 of the method, data comprising unique identifiers for the plurality of targets is transmitted from mobile devices within the first area and collected by wireless packet analyzers. The wireless packet analyzers include first and second wireless packet analyzers, the first wireless packet analyzer collecting a group of unique identifiers and the second wireless packet analyzer collecting at least one unique identifier. In an example embodiment, the second wireless packet analyzer collects only a single unique identifier. In an example embodiment, the second wireless packet analyzer collects multiple unique identifiers including only a single unique identifier that is also collected by the first wireless packet analyzer. In alternate embodiments, regardless of the number of unique identifiers, the first and second wireless packet analyzers collect a shared unique identifier of an identifiable target.

At step 460 of the method, the digital identity of the target in the plurality of targets in the first area is determined based on a correlation between the tracking of the target and the unique identifiers collected by the second wireless packet analyzers. At least one unique identifier is common to both groups collected by the first and second wireless packet analyzers. In example embodiments, the first and second wireless packet analyzers collect multiple unique identifiers, but only one identifier is common to both.

Advantageously, the inventive systems and methods described herein enable digital identity detection based on mobile device detection that is less expensive and cumbersome than conventional systems and methods that require triangulation. Additionally, the systems and methods described herein advantageously enable digital identity retrieval using tracking technology where the tracking technology does not have be provided by the incident detection system so that the tracking can extend beyond the area covered by the sensors of the incident detection system.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. A method of tracking at least one target, the method comprising the steps of:
    detecting and localizing an incident in a first area using a first sensor system, the first sensor system having a video surveillance system with a network of a plurality of cameras or an acoustic detecting system with a network of microphones;
    determining the at least one target to be identified within a plurality of targets associated with the incident in the first area;
    tracking the at least one target from the first area to a second area separate from the first area using a second sensor system;
    collecting, by first and second wireless packet analyzers, data comprising unique identifiers for the plurality of targets, the first wireless packet analyzer collecting first and second unique identifiers in a first detection area covering the first area and the second wireless packet analyzer collecting the first or second unique identifier in a second detection area covering the second area, each unique identifier collected for each target of the plurality of targets being from a mobile device; and
    determining the digital identity of the at least one target in the first area based on a correlation between the tracking of the at least one target to the second area and the first or second unique identifier collected by the second wireless packet analyzer.

2. The method of claim 1, further comprising the step of collecting, by the second wireless packet analyzer, a third unique identifier that is not collected by the first wireless packet analyzer.

3. The method of claim 1, wherein the second sensor system is part of the first sensor system.

4. The method of claim 1, wherein the first and second detection areas of the first and second wireless packet analyzers, respectively, do not overlap.

5. The method of claim 1, further comprising the step of tracking the at least one target in a third area using the determined digital identity and a third wireless packet analyzer.

6. The method of claim 5, wherein the second area is separate and distinct from the first area and not covered by the first sensor system.

7. A system for tracking at least one target, comprising:
    a first sensor system configured to detect and localize an incident in a first area, the first sensor system having a video surveillance system with a network of a plurality of cameras or an acoustic detection system with a network of microphones;
    a second sensor system configured to track the at least one target within a plurality of targets associated with the incident from the first area to a second area separate from the first area;
    first and second wireless packet analyzers configured to collect data comprising unique identifiers for the plurality of targets, the first wireless packet analyzer configured to collect first and second unique identifiers in a first detection area covering the first area and the second wireless packet analyzer configured to collect the first or second unique identifier in a second detection area covering the second area, each unique identifier collected for each target of the plurality of targets being from a mobile device; and
    a controller configured to determine the digital identity of the at least one target in the first area based on a correlation between the tracking of the at least one target to the second area and the first or second unique identifier collected by the second wireless packet analyzer.

8. The system of claim 7, wherein the second sensor system is part of the first sensor system.

9. The system of claim 7, wherein the first and second detection areas of the first and second wireless packet analyzers, respectively, do not overlap.

* * * * *